United States Patent Office 3,775,501
Patented Nov. 27, 1973

3,775,501
PREPARATION OF AROMATICS OVER
ZEOLITE CATALYSTS
Warren W. Kaeding, Westfield, and Stephen A. Butter,
East Windsor, N.J., assignors to Mobil Oil Corporation
No Drawing. Filed June 5, 1972, Ser. No. 259,626
Int. Cl. C07c 5/26, 5/27
U.S. Cl. 260—673     24 Claims

ABSTRACT OF THE DISCLOSURE

There is an increase in the yield of aromatics when air is fed with a hydrocarbon feed to a catalyst bed containing a crystalline aluminosilicate catalyst of the ZSM-5 type.

BACKGROUND OF THE INVENTION

Field of the invention

This invention relates to the production of aromatics from hydrocarbons. More particularly the invention is concerned with the production of such aromatics from hydrocarbons passed over an aluminosilicate catalyst and with an improvement whereby the yield of aromatics is increased substantially.

Description of the prior art

It has been known for some time that synthetic zeolites may be suitably used to produce aromatic compounds from olefins. For instance, U.S. Pat. 2,972,643 describes a process for producing aromatics from a $C_2$ to $C_7$ olefin by passing such olefin over a synthetic zeolite prepared as taught in Example 1 of the patent. The zeolites preferred by patentees have from about 200 to 700 square meters of surface area per gram and pore openings of from not less than 6 A. to about 15A.

SUMMARY OF THE INVENTION

In accordance with the invention there is provided a process for improving the yield of aromatics from hydrocarbons which comprises contacting a mixture of said hydrocarbon and oxygen or air with a crystalline aluminosilicate catalyst.

DESCRIPTION OF SPECIFIC EMBODIMENTS

In general, the present invention is concerned with a process for increasing the yield of aromatics from a hydrocarbon feed comprising a mixture of air or oxygen and a hydrocarbon having from 2 to about 16 carbon atoms by passing said mixture over a catalyst comprising a crystalline aluminosilicate having uniform pore openings of greater than 5 angstrom units. In addition to the increase in aromatics, the results obtained suggest that the presence of oxygen offers the potential for carrying out the reaction with a net heat balance. Thus, the endothermic reaction observed for paraffinic feeds would be balanced by the exothermic reactions of oxygen to form carbon monoxide, carbon dioxide and water in scaled up commercial plants. This would be an important factor in reducing the complexity and costs of such plants.

Another effect of oxygen is that higher severities (conversions) are obtained at a given temperature, or a given severity can be achieved at a lower temperature, when compared to similar runs in the absence of oxygen. Furthermore, oxygen may react with hydrogen to prevent reversals of equilibrium reactions that give back the starting materials.

The catalyst utilized in the process described herein is prepared from synthetic or naturally occurring aluminosilicates having active sites within their ordered internal structures that provide selective activity for effecting aromatization of the hereindefined paraffins and olefins. The active sites are produced by exchanging the aluminosilicate with metal cations and/or hydrogen cations so the exchangeable metal cations, such as those of the alkali metals, are partially or substantially replaced thereby. Preferably the aluminosilicate is exchanged so that a substantial proportion of the original alkali metal is replaced with hydrogen, ammonium, a metal such as uranium, platinum, gold, nickel, zinc, copper, uranium and the like, or combinations of these.

As has been stated, the olefin has from 2 to about 16 carbon atoms. Thus suitable hydrocarbon reactants are ethylene, propylene, propane, butylene, butane, amylene, hexane, octene, decane, dodecene, hexadecane and the like.

The catalysts utilizable in this invention are characterized by: (1) having a silica to alumina ratio greater than 15, and preferably greater than 20; (2) having been crystallized from a solution containing organic cations so the aluminosilicate as synthesized contains organic cations; and (3) having pore sizes greater than about 5 angstrom units.

For reasons which are not completely understood, it has been found that zeolites which are crystallized from a solution containing organic cations and which contain an organic cation as synthesized such that the organic cations satisfy at least in part the electronegative property of the aluminum atoms in the crystal lattice are, indeed, very effective catalysts for the aromatization of olefins when they also contain the other characteristics previously referred to with respect to the silica to alumina ratio and the pore size. The effectiveness of catalysts of this type can stem from a wide variety of factors but paramount is the fact that they are able to maintain their selectivity for desired reaction products over prolonged periods of time, i.e. these materials are highly stable and highly selective during the reaction conditions which must be utilized. The formation of crystalline aluminosilicates from solutions containing organic cations is known in the art as a synthesis technique and it has been discovered that any organic cation will function providing the zeolite possesses the other characteristics above described. However, particular preference is given to those aluminosilicates which are synthesized from solutions containing alkyl ammonium and alkyl phosphonium cations.

Representative crystalline aluminosilicate zeolites which have the characteristics previously set forth include zeolite Beta, TEA mordenite, ZSM-12 and a family of zeolites referred to as ZSM-5 type which include as members ZSM-5, ZSM-8 and ZSM-11.

Zeolite Beta is a well known zeolite synthesized from a solution containing tetraethylammonium ions and is described and claimed in U.S. Pat. 3,308,069.

TEA mordenite is also synthesized from a solution containing tetraethylammonium ions and has the following formula in terms of mole ratios of oxides in its synthesized form:

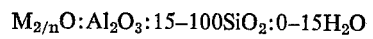

wherein M is a mixture of cations, at least one of which is tetraalkylammonium and $n$ is the valence of M.

TEA mordenite has the crystal structure of mordenite.

TEA mordenite is disclosed and claimed in copending application Ser. No. 795,694, filed Jan. 31, 1969.

ZSM-12 as synthesized has a formula in terms of mole ratios of oxides as follows:

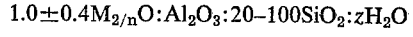

wherein M is a mixture of cations at least one of which is tetraalkylammonium, $n$ is the valence of cations M and $z$ is 0-60.

However, the most preferred zeolites which are employed in the novel aromatization processes of this invention are those zeolites which are generally referred to as being ZSM-5 type materials. ZSM-5 type zeolites which are used in the novel conversion process of this invention can be generally stated to have a pore size greater than the 5 angstrom materials and less than the large pore zeolites such as zeolite X, zeolite Beta, etc.

Before the discovery of the ZSM-5 type zeolites all the crystalline aluminosilicates heretofore employed in the prior art conversion processes fell into one of two general types. They either had pore sizes of about 5 angstrom units or had pore sizes of from about 6 to about 15 angstrom units. The 5 angstrom unit aluminosilicates were generally stated to be shape selective in that they allowed selective conversion of normal aliphatic compounds from a mixture of the same of iso-aliphatic compounds and cyclic compounds. The second type of aluminosilicate, i.e. those generally stated as having a pore size of 6 to 15 angstrom units will admit both normal and iso-aliphatic compounds. Thus a very convenient method of identifying a good shape selective catalyst was to show that it would selectively sorb hexane from a mixture of the same with 2-methyl pentane since the former compound was able to enter its internal pore structure whereas the latter iso-compound was unable to do so.

The ZSM-5 type zeolites which are used in the novel process of this invention can generally be stated to be intermediate between the two types of aluminosilicates previously described. Thus, the ZSM-5 type catalysts used in this invention have the property of allowing the entry into their internal pore structure of normal aliphatic compounds and slightly branched aliphatic compounds, particularly monomethyl substituted compounds, yet they substantially exclude all compounds containing at least a quaternary carbon atom or having a molecular dimension equal to or substantially greater than a quaternary carbon atom. Thus, if one were to measure the selectivity of the ZSM-5 type materials employed in the process of this invention with regard to their ability to sorb n-hexane in admixture with 2-methyl pentane, i.e., the ability to selectively sorb hexane from a mixture of the same with iso-hexane, these catalysts would have to be stated as being non-shape selective. It should be immediately apparent, however, that the term selectivity has a far greater significance than merely the ability to preferentially distinguish between normal paraffins and isoparaffins. Selectivity on shape is theoretically possible at any shape or size although, quite obviously, such selectivity might not result in an advantageous catalyst for any and all hydrocarbon conversion processes.

While not wishing to be bound by any theory of operation nevertheless, it appears that the crystalline zeolitic materials of the ZSM-5 type employed in the instant invention cannot simply be characterized by the recitation of a pore size or a range of pore sizes. It would appear that the uniform pore openings of this new type of zeolite are not approximately circular in nature, as is usually the case in the heretofore employed zeolites, but rather, are approximately elliptical in nature. Thus, the pore openings of the instant zeolitic materials have both a major and a minor axis, and it is for this reason that the unusual and novel molecular sieving effects are achieved. This elliptical shape can be referred to as a "keyhole." It would appear that the minor axis of the elliptical pores in the zeolites apparently have an effective size of about 5.5 angstrom units. The major axis appears to be somewhere between 6 and about 9 angstrom units. The unique keyhole molecular sieving action of these materials is presumably due to the presence of these approximately elliptically shaped windows controlling access to the internal crystalline pore structure.

A test method has been devised in order to determine whether or not a zeolite possesses the unique molecular sieving properties necessary to be combined with a large pore zeolite in order to carry out the novel conversion process of this invention. In said test method a candidate zeolite free from any matrix or binder is initially converted to the so-called acid or hydrogen form. This procedure involves exhaustive exchange with an ammonium chloride solution in order to replace substantially all metallic cations originally present. The sample is then dried, sized to 20-30 mesh and calcined in air for 16 hours at 550° C. One gram of the so-treated is then contacted with benzene at a pressure of 12 mm. Hg at a temperature of 25° C. for a time period of two hours. Another gram sample is contacted with mesitylene at a pressure of 15 mm. Hg at a temperature of 25° C. for a period of six hours. A preferred zeolite is one whose acid form will adsorb at least 3.0 weight percent benzene and less than 1.5 weight percent mesitylene at the above-recited conditions.

Examples of zeolitic materials which are operable in the process of this invention are ZSM-5 type which family includes not only ZSM-5 but also ZSM-8 and ZSM-11 zeolites. ZSM-5 type materials are disclosed and claimed in copending application Ser. No. 865,472, filed Oct. 10, 1969, ZSM-8 in copending application Ser. No. 865,418, filed Oct. 10, 1969 and ZSM-11 in copending application Ser. No. 31,421, filed Apr. 23, 1970. A process utilizing a combination of ZSM-5 type zeolites and large pore zeolites is disclosed in Ser. No. 78,573, filed Oct. 6, 1970.

The family of ZSM-5 compositions has the characteristic X-ray diffraction pattern set forth in Table 1, hereinbelow. ZSM-5 compositions can also be identified, in terms of mole ratios of oxides, as follows:

$$0.9 \pm 0.2 M_{2/n}O : W_2O_3 : 5\text{--}100 YO_2 : zH_2O$$

wherein M is a cation, n is the valence of said cation, W is selected from the group consisting of aluminum and gallium, Y is selected from the group consisting of silicon and germanium, and z is from 0 to 40. In a preferred synthesized form, the zeolite has a formula, in terms of mole ratios of oxides, as follows:

$$0.9 \pm 0.2 M_{2/n}O : Al_2O_3 : 5\text{--}100 SiO_2 : zH_2O$$

and M is selected from the group consisting of a mixture of alkali metal cations, especially sodium, and tetraalkylammonium cations, the alkyl groups of which preferably contain 2-5 carbon atoms.

In a preferred embodiment of ZSM-5, W is aluminum, Y is silicon and the silica/alumina ratio is at least 10 and ranges up to about 60.

Members of the family of ZSM-5 zeolites posses a definite distinguishing crystalline structure whose X-ray diffraction pattern shows the following significant lines:

TABLE 1

| Interplanar spacing $d$ (A.): | Relative intensity |
|---|---|
| 11.1±0.2 | S. |
| 10.0±0.2 | S. |
| 7.4±0.15 | W. |
| 7.1±0.15 | W. |
| 6.3±0.1 | W. |
| 6.04±0.1 | W. |
| 5.97±0.1 | W. |
| 5.56±0.1 | W. |
| 5.01±0.1 | W. |
| 4.60±0.08 | W. |
| 4.25±0..08 | W. |
| 3.85±0.07 | V.S. |
| 3.71±0.07 | S. |
| 3.64±0.05 | M. |
| 3.04±0.03 | W. |
| 2.99±0.02 | W. |
| 2.94±0.2 | W. |

These values as well as all other X-ray data were determined by standard techniques. The radiation was the K-alpha double of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 $I/I_0$, where $I_0$ is the intensity of the strongest line or peak, and $d$ (obs.), the interplanar spacing in A, corresponding to the recorded lines, were calculated. In Table 1 the relative intensities are given in terms of the symbols S.=strong, M.=medium, M.S.=medium strong, M.W.=medium weak and V.S.=very strong. It should be understood that this X-ray diffraction pattern is characteristic of all the species of ZMS-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-ray diffraction—ZSM-5 powder in cation exchanged forms, d spacings observed]

| As Made | HCl | NaCl | CaCl₂ | AgNO₃ |
|---|---|---|---|---|
| 11.15 | 11.16 | 11.19 | 11.19 | 11.19 |
| 10.01 | 10.03 | 10.05 | 10.01 | 10.01 |
| 9.74 | 9.78 | 9.80 | 9.74 | 9.77 |
|  |  | 9.01 | 9.02 | 8.99 |
| 8.06 |  |  |  |  |
| 7.44 | 7.46 | 7.46 | 7.46 | 7.46 |
| 7.08 | 7.07 | 7.09 | 7.11 | 7.09 |
| 6.70 | 6.72 | 6.73 | 6.70 | 6.73 |
| 6.36 | 6.38 | 6.38 | 6.37 | 6.37 |
| 5.99 | 6.00 | 6.01 | 5.99 | 6.01 |
| 5.70 | 5.71 | 5.73 | 5.70 | 5.72 |
| 5.56 | 5.58 | 5.58 | 5.57 | 5.53 |
| 5.37 |  | 5.38 | 5.37 | 5.37 |
| 5.13 | 5.11 | 5.14 | 5.12 |  |
| 4.99 | 5.01 | 5.01 | 5.01 | 5.01 |
|  |  | 4.74 |  |  |
| 4.61 | 4.62 | 4.62 | 4.61 | 4.62 |
|  |  | 4.46 | 4.46 | 4.46 |
| 4.36 | 4.37 | 4.37 | 4.36 | 4.37 |
| 4.26 | 4.27 | 4.27 | 4.26 | 4.27 |
| 4.08 |  | 4.09 | 4.09 | 4.09 |
| 4.00 | 4.01 | 4.01 | 4.00 | 4.01 |
| 3.84 | 3.85 | 3.85 | 3.85 | 3.86 |
| 3.82 | 3.82 | 3.82 | 3.82 | 3.82 |
| 3.75 | 3.75 | 3.75 | 3.76 | 3.75 |
| 3.72 | 3.72 | 3.72 | 3.72 | 3.72 |
| 3.64 | 3.65 | 3.65 | 3.65 | 3.65 |
|  | 3.60 | 3.60 | 3.60 | 3.60 |
| 3.48 | 3.49 | 3.49 | 3.48 | 3.49 |
| 3.44 | 3.45 | 3.45 | 3.44 | 3.45 |
| 3.34 | 3.35 | 3.36 | 3.35 | 3.35 |
| 3.31 | 3.31 | 3.32 | 3.31 | 3.32 |
| 3.25 | 3.25 | 3.26 | 3.25 | 3.25 |
| 3.17 |  |  | 3.17 |  |
| 3.13 | 3.14 | 3.14 | 3.14 | 3.14 |
| 3.05 | 3.05 | 3.05 | 3.04 | 3.05 |
| 2.98 | 2.98 | 2.99 | 2.98 | 2.99 |
|  | 2.95 | 2.95 | 2.94 | 2.95 |
| 2.85 | 2.87 | 2.87 | 2.87 | 2.87 |
| 2.80 |  |  |  |  |
| 2.78 |  |  | 2.78 | 2.78 |
| 2.73 | 2.74 | 2.74 | 2.73 | 2.74 |
| 2.67 |  |  | 2.68 |  |
| 2.66 |  |  | 2.65 |  |
| 2.60 | 2.61 | 2.61 | 2.61 | 2.61 |
|  | 2.59 |  | 2.59 |  |
| 2.57 |  | 2.57 | 2.56 | 2.57 |
| 2.50 | 2.52 | 2.52 | 2.52 |  |
| 2.49 | 2.49 | 2.49 | 2.49 | 2.49 |
|  |  |  | 2.45 |  |
| 2.41 | 2.42 | 2.42 | 2.42 |  |
| 2.39 | 2.40 | 2.40 | 2.39 | 2.40 |
|  |  |  | 2.38 | 2.38 |
|  | 2.33 |  | 2.33 | 2.33 |
|  | 2.30 |  |  |  |
|  | 2.24 | 2.23 | 2.23 |  |
|  | 2.20 | 2.21 | 2.20 |  |
|  | 2.18 | 2.18 |  |  |
|  |  | 2.17 | 2.17 |  |
|  | 2.13 |  | 2.13 |  |
|  | 2.11 | 2.11 |  |  |
|  |  |  | 2.10 |  |
|  | 2.08 | 2.08 |  | 2.08 |
|  |  | 2.07 | 2.07 |  |
|  |  |  | 2.04 |  |
| 2.01 | 2.01 | 2.01 | 2.01 | 2.01 |
| 1.99 | 2.00 | 1.99 | 1.99 | 1.99 |
|  |  |  | 1.97 |  |
| 1.95 | 1.95 | 1.95 | 1.95 |  |
| 1.92 | 1.92 | 1.92 | 1.92 | 1.92 |
| 1.92 |  |  |  |  |
| 1.87 | 1.87 | 1.87 | 1.87 | 1.87 |
|  | 1.86 |  |  |  |

TABLE 2—Continued

| As Made | HCl | NaCl | CaCl₂ | AgNO₃ |
|---|---|---|---|---|
| 1.84 | 1.84 |  |  | 1.84 |
| 1.83 | 1.83 | 1.83 | 1.83 |  |
| 1.82 |  | 1.81 |  |  |
| 1.77 | 1.77 | 1.77 | 1.78 | 1.77 |
| 1.76 | 1.76 | 1.76 | 1.76 | 1.76 |
|  |  | 1.75 |  | 1.75 |
|  | 1.74 | 1.74 | 1.73 |  |
| 1.71 | 1.72 | 1.72 | 1.71 | 1.70 |
| 1.67 | 1.67 | 1.67 |  | 1.67 |
| 1.66 | 1.66 |  | 1.66 | 1.66 |
|  |  | 1.65 | 1.65 |  |
|  |  | 1.64 | 1.64 |  |
|  | 1.63 | 1.63 | 1.63 | 1.62 |
|  | 1.61 | 1.61 | 1.61 | 1.61 |
| 1.58 |  |  |  |  |
|  | 1.57 | 1.57 |  | 1.57 |
|  |  | 1.56 | 1.56 |  |

Zeolite ZSM-5 can be suitably prepared by preparing a solution containing tetrapropyl ammonium hydroxide, sodium oxide, and oxide of aluminum or gallium, an oxide of silica and water and having a composition, in terms of mole ratios of oxides, falling within the following ranges:

TABLE 3

|  | Broad | Preferred | Particularly preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon maintaining the mixture until crystals of the zeolite are formed. Thereafter the crystals are separated from the liquid and recovered. Typical reaction conditions consist of heating the foregoing reaction mixture to a temperature of from about 75° C. to 175° C. for a period of time of from about six hours to 60 days. A more preferred temperature range is from about 90 to 150° C. with the amount of time at a temperature in such range being from about 12 hours to 20 days.

The digestion of the gel particles is carried out until crystals form. The solid product is separated from the reaction medium, as by cooling the whole to room temperature, filtering, and water washing.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides, as follows:

$$0.9 \pm 0.2 M_{2/n}O : Al_2O_3 : 5\text{-}100 SiO_2 : zH_2O$$

wherein M is at least one cation, n is the valence thereof and z is from 0 to 40. In a preferred synthesized form, the zeolite has a formula, in terms of mole ratios of oxides, as follows:

$$0.9 \pm 0.2 M_{2/n}O : Al_2O_3 : 10\text{-}60 SiO_2 : zH_2O$$

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| d A. | I/I₀ | I/I₀ | d A. |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a solution containing either tetraethylammonium hydroxide or tetraethylammonium bromide together with sodium oxide, aluminum oxide, and an oxide or silica and water.

The relative operable proportions of the various ingredients have not been fully determined and it is to be immediately understood that not any and all proportions of reactants will operate to produce the desired zeolite.

In fact, completely different zeolites can be prepared utilizing the same starting materials depending upon their relative concentration and reaction conditions as is set forth in United States 3,308,069. In general, however, it has been found that when tetraethylammonium hydroxide is employed, ZMS-8 can be prepared from said hydroxide, sodium oxide, aluminum oxide, silica and water by reacting said materials in such proportions that the forming solution has a composition in terms of mole ratios of oxides falling within the following range:

$SiO_2/Al_2O_3$—from about 10 to about 200

$Na_2O$/tetraethylammonium hydroxide—from about 0.05 to 0.20

Tetraethylammonium hydroxide/$SiO_2$—from about 0.08 to 1.0

$H_2O$/tetraethylammonium hydroxide—from about 80 to about 200.

Thereafter, the crystals are separated from the liquid and recovered. Typical reaction conditions consists of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

The foregoing product is dried, e.g. at 230° F. for from about 8 to 24 hours. Of course, milder conditions may be employed if desired, e.g., room temperature under vacuum.

As has heretofore been stated, a zeolite of the ZSM-5 type above-described is used in conjunction with a large pore zeolite, i.e. one having a pore size greater than 7 angstrom units which has the ability to act upon substantially all the components usually found in a commerical gas oil. Large pore aluminosilicates of this type are well known and include natural and synthetic faujasite of both the X and Y type, as well as zeolite L. Of these materials, zeolite Y is particularly preferred.

Both the large pore zeolites and the ZSM-5 type zeolites used in the instant invention usually have the original cations according to techniques well known in the art. Typical replacing cations would include hydrogen, ammonium and metal cations including mixtures of the same. Of the replacing metallic cations, particular preference is given to cations of rare earth, $Mg^{++}$, $Zn^{++}$, $Mn^{++}$, $Al^{+++}$, and $Ca^{++}$.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including United States 3,140,249; 3,140,251; and 3,140,253.

Following contact with the salt solution of the desired replacing cation, the zeolites may be washed with water and dried at a temperature ranging from 150° F. to about 600° F. and thereafter heated in air or other inert gas at temperatures ranging from about 500° F. to 1500° F. for periods of time ranging from 1 to 48 hours or more.

The particle size of each type of zeolite making up the catalyst system is not narrowly critical but should be less than 100 microns and particle sizes within the range of from less than 0.1 to 10 microns are preferred. It is also to be noted that each individual component in the catalyst system need not be of the same particle size.

It is also to be understood that this invention does not encompass zeolites that have been base exchanged with organic cations subsequent to their crystallization from solutions which *do not* contain organic cations. Thus, for example, this invention does not envision the use of a zeolite such as zeolite Y which has been dealuminized so as to increase its silica to alumina ratio and thereafter contacted with a solution such as tetrapropylammonium chloride. A material such as that is not one which has *been crystallized* from a solution containing an organic cation and such is a necessary prerequisite in optimizing a reformate or reformer effluent in accordance with this invention.

The zeolites used in the instant invention preferably have the original cations associated therewith replaced by a wide variety of other cations according to techniques well known in the art. Typical replacing cations would include hydrogen, ammonium and metal cations, including mixtures of the same. Of the replacing cations, particular preference is given to cations of hydrogen, ammonium, uranium, gold, transition metals, Group VIII metals, magnesium, zinc, calcium, nickel and mixtures thereof.

One embodiment of this invention resides in the use of a porous matrix together with the zeolites previously described. The zeolites can be combined, dispersed or otherwise intimately admixed with a porous matrix in such proportions that the resulting product contains from 1% to 95% by weight, and preferably from 10 to 70% by weight of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, alumina and inorganic oxides. Inorganic compositions especially those of a siliceous nature are preferred. Of these matrices, inorganic oxides such as clay, chemically treated clay, silica, silica-alumina, etc., are particularly preferred because of their superior porosity, attrition resistance, and stability.

Techniques for incorporating the zeolites in a matrix are conventional in the art and are set forth in United States 3,140,253.

Aromatization in accordance with the present process is generally carried out at a temperature between about 500° F. and 1300° F., preferably about 650° F. to about 1150° F., at pressures ranging from about 1 atmosphere to about 10 atmospheres. The weight hourly space velocity (WHSV), i.e. the weight of hydrocarbon per hour per weight of catalyst, is from about 0.5 to about 10, preferably between about 1 and about 3. The amount of hydrocarbon calculated as gas hourly space velocity (GHSV) is from about 300 to about 1500, with the preferred range being from about 500 to about 1000. GHSV is defined as the volume of gaseous hydrocarbon feed per volume of catalyst per hour of run time.

The molar ratio of oxygen/hydrocarbon may for best results be varied over the range of from about 0.1 to about 0.75, preferably from about 0.15 to about 0.5. The precise ratio selected will, of course, be governed to a large extent by temperature, the catalyst used and the space velocity.

Contact times in seconds ("CT" in the examples that follow) are determined by dividing catalyst volume in ml. times 60 by the total gas feed rate in ml. per minute. The contact times may vary from about 1 to about 20 seconds, preferably from about 2 to about 10 seconds.

The following examples will illustrate the best mode known for carrying out this invention. In Examples 1–5, catalytic reactions starting with ethylene were screened over the hydrogen form of ZSM–5 (HZSM–5) and a variety of ion exchanged forms thereof. Small glass reactors were used, at atmospheric pressure and with catalyst volumes of about 10 ml. (5 gm.).

The HZSM–5 can be prepared in the following manner. A solution composed of 240 pounds of Q-brand sodium silicate (28.5 weight percent $SiO_2$, 8.8 weight percent $Na_2O$ and 62.7 weight percent $H_2O$) and 300 pounds of water is continuously mixed with a second solution containing 7.3 pounds of $Al_2(SO_4)_3 \cdot xH_2O$ (16.7 weight percent $Al_2O_3$), 30 pounds of tetrapropylammonium bromide, 20 pounds of $H_2SO_4$, 90 pounds of NaCl and 410 pounds of $H_2O$ in a mixing nozzle. The resultant gelatinous precipitate is discharged from the nozzle into an agitated 120 gallon vessel. The vessel is heated to 210° F. and held for 8 days while agitating at 24 r.p.m. The product obtained is 90 percent ZSM–5 by X-ray diffraction and has a chemical $SiO_2$ to $Al_2O_3$ ratio of 67.0. The crystallized product is washed essentially free of soluble salts by decantation, then filtered. The washed filter cake is dried at about 250° F. After this sodium form of ZSM–5 is made, it is exchanged 4 times, one hour each, with 5% $NH_4Cl$ solution at room temperature. After washing to free the $NH_4$ exchanged ZSM–5 of soluble chlorides, the product is dried for about 3 hours and then is calcined at a final calcination temperature of 1000° F.

The hydrogen or ammonium forms of ZSM–5 may be used for preparing the impregnated catalysts by methods that are well known to the art. For example, solutions of chloroplatenic acid uraryl nitrate, chloroauric acid or zinc nitrate may be used in concentrations sufficient to provide from about 0.01 to about 2% by weight of metal based on the weight of ZSM–5. The amount of solution used is dependent on the absorptive capacity of the zeolite and in the case of $NH_4$-ZSM–5, the form used for impregnation, a pore volume of 0.68 cc./g. was determined. A typical procedure utilizes the calcined form of originally prepared ZSM–5 to convert to the ammonium form by passing an aqueous ammonium compound over ZSM–5, washing the zeolite and drying for about 16 hours at about 240° F. About 10 g. of this powder is triturated with 0.2000 g. of chloroauric acid in 6.8 cc. of water until all the liquid is evenly absorbed. The solid is then dried at 230° F. The other catalysts of the invention can be prepared similarly from other metal ions.

EXAMPLE 1

This example illustrates the use of HZSM–5 with ethylene.

| | | | | |
|---|---|---|---|---|
| Total time catalyst on stream, hrs | 1.5 | 3 | 9 | 21 |
| No. of regenerations | 0 | 0 | 0 | 2 |
| $C_2H_4$ feed rate, cc./min., r.t. | 100 | 100 | 100 | 100 |
| $N_2$ feed rate, cc./min., r.t. | 0 | 0 | 0 | 0 |
| Air | 0 | 0 | 0 | 100 |
| GHSV, total gas feed | 492 | 492 | 492 | 995 |
| CT | 5.6 | 5.6 | 5.6 | 2.8 |
| Temperature reaction, °C | 300 | 350 | 350 | 440 |
| Liquid prod. ($H_2O$ condenser), total | 71 | 79 | 88 | 55 |
| Aromatic, wt. percent | 45 | 51 | 39 | 90 |
| Aliphatic, wt. percent | 55 | 49 | 61 | 10 |
| Product summary: | | | | |
| Aromatic, wt. percent | 32 | 40 | 34 | 50 |
| Aliphatic, wt. percent | 68 | 60 | 66 | 50 |
| Conversion, percent | | >90 | >95 | >95 |

EXAMPLE 2

This example illustrates conversion of an ethylene feed using a platinum and ammonia ion-exchanged ZSM–5 catalyst. The catalyst contained 0.49% by weight of platinum.

| | | | | |
|---|---|---|---|---|
| Total time catalyst on stream, hrs | 1.3 | 2.6 | 3.9 | 5.2 |
| No. of regenerations | 0 | 0 | 1 | 1 |
| $C_2H_4$ feed rate, cc./min., r.t. | 100 | 100 | 50 | 50 |
| $N_2$ feed rate, cc./min., r.t. | 100 | 0 | 50 | 0 |
| Air | 0 | 100 | 0 | 50 |
| GHSV, total gas feed | 995 | 995 | 492 | 492 |
| CT | 2.8 | 2.8 | 5.6 | 5.6 |
| Temperature reaction, °C | 415 | 460 | 395 | 400 |
| Liquid prod. ($H_2O$ condenser), total | 29 | 49 | 38 | 44 |
| Aromatic, wt. percent | 89 | 85 | 92 | 91 |
| Aliphatic, wt. percent | 11 | 15 | 8 | 9 |
| Liquid product (Dry Ice trap), wt. percent | 43 | 29 | 24 | 29 |
| Product summary: | | | | |
| Aromatic, wt. percent | 29 | 43 | 37 | 42 |
| Aliphatic, wt. percent | 71 | 57 | 63 | 58 |
| Conversion, percent | 99+ | 96 | 99+ | 99+ |

EXAMPLE 3

This example shows the use of Au-HZSM–5 as the aromatization catalyst, containing 0.044% of gold. The feed is ethylene.

| | | |
|---|---|---|
| Total time cayalyst on stream, hrs | 1.5 | 4.8 |
| No. of regenerations | 0 | 0 |
| $C_2H_4$ feed rate, cc./min., r.t. | 100 | 50 |
| $N_2$ feed rate, cc./min., r.t. | 0 | 0 |
| Air | 0 | 50 |
| GHSV, total gas feed | 492 | 492 |
| CT | 6 | 6 |
| Temperature reaction °C | 360 | 380 |
| Liquid prod. ($H_2O$ condenser), total | 53 | 54 |
| Aromatic, wt. percent | 62 | 93 |
| Aliphatic, wt. percent | 38 | 7 |
| Liquid product (Dry Ice trap), wt. percent | 40 | 22 |
| Product summary: | | |
| Aromatic, wt. percent | 38 | 47 |
| Aliphatic, wt. percent | 62 | 53 |
| Conversion, percent | 99 | 97 |

EXAMPLE 4

For this example a U-ZSM–5 containing 0.26% of uranium was used to convert ethylene.

| | | |
|---|---|---|
| Total time catalyst on stream, hrs | 1.8 | 3 |
| No. of regenerations | 0 | 0 |
| $C_2H_4$ feed rate, cc./min., r.t. | 100 | 100 |
| $N_2$ feed rate, cc./min., r.t. | 0 | 0 |
| Air | 0 | 100 |
| GHSV, total gas feed | 492 | 492 |
| CT | | |
| Temperature reaction, °C | 380 | 425 |
| Liquid prod. ($H_2O$ condenser), total | 47 | 38 |
| Aromatic, wt. percent | 67 | 86 |
| Aliphatic, wt. percent | 33 | 14 |
| Liquid product (Dry Ice trap), wt. percent | 25 | 50 |
| Product summary: | | |
| Aromatic, wt. percent | 33 | 36 |
| Aliphatic, wt. percent | 67 | 64 |
| Conversion, percent | 95 | |

EXAMPLE 5

This example illustrates the distribution and types of aromatics that can be expected.

DISTRIBUTION OF MAJOR AROMATIC PRODUCTS
[Liquid product, Pt-$NH_4$-ZSM-5, ethylene feed]

| Oxygen in feed | No | Yes | No | Yes |
|---|---|---|---|---|
| Total aromatic yield | 29 | 43 | 37 | 42 |
| Benzene, wt. percent in liquid product | ~1 | ~1 | ~1 | ~1 |
| Toluene | 12.1 | 7.7 | 17.0 | 11.2 |
| m+p-Xylene | 22.2 | 18.8 | 23.4 | 21.4 |
| o-Xylene | 5.0 | 4.4 | 5.6 | 4.7 |
| m+p-Ethyl toluene [a] | 15.9 | 17.7 | 10.9 | 15.5 |
| Pseudocumene | 7.4 | 6.8 | 7.1 | 7.9 |
| 3-ethyl-m-xylene | 4.8 | 6.5 | 3.6 | 5.5 |
| 2+3-methyl-p-ethyltoluenes | 4.2 | 6.5 | 3.2 | 6.2 |
| 1+2 methyl naphthalene | 2.0 | 1.0 | 3.7 | 2.5 |
| All other aromatic | 15.2 | 16.4 | 17.6 | 16.2 |

[a] Probably includes some p-cymene.

EFFLUENT GAS STREAM COMPOSITION
[Pt-$NH_4$-ZSM-5, ethylene feed]

| Oxygen in feed | No | Yes | No | Yes |
|---|---|---|---|---|
| Air/nitrogen, mole percent | 89.3 | 79.9 | 82.0 | 75.0 |
| CO | 0 | 2.1 | 0 | 1.6 |
| $CH_4$ | 0.2 | 0.2 | 0.2 | 0.2 |
| $C_2H_4$ | 6.2 | 1.3 | 11.0 | 2.4 |
| $CO_2$ | 0 | 8.9 | 0 | 13.5 |
| $C_2H_6$ | 0.4 | 2.5 | 0.5 | 0.3 |
| $C_3H_6$ | 6.9 | 3.7 | 5.1 | 5.6 |
| $C_3H_8$ | 0.4 | 0.4 | 0.3 | 0.3 |
| $C_4$ | 1.9 | 1.0 | 0.9 | 1.1 |
| $C_5$ | 0.2 | 0 | 0.1 | 0 |
| Wt. percent of total organic product in gas stream | 28 | 22 | 38 | 27 |

Based on corrected gas chromatographic analysis (peak heights).

When certain metal ion exchanged zeolites are used, there is a reduction in aromatics content, sometimes a very drastic reduction. Ag-ZSM-5, for example, reduces the aromatics content in the liquid product from 46% (without air) to 30% (with air). Ce-ZSM-5 shows poor selectivity for aromatic products. Fe-ZSM-5 is among the poorest, as shown by the following table:

| Time on stream, hours | Temp., °C | GHSV | Oxygen present | Aromatic yield |
|---|---|---|---|---|
| 2.5 | 355 | 492 | No | 31 |
| 7 | 350 | 492 | No | 33 |
| 9.5 | 420 | 492 | Yes | 10 |

EXAMPLE 6
[Propylene, HZSM-5]

| Run Number | 1 | 2 | 3 | 4 | 5 | 6 | 7 |
|---|---|---|---|---|---|---|---|
| Total time catalyst on stream, hrs | 1.0 | 2.5 | 4.0 | 5.5 | 7 | 8.5 | 9.5 |
| No. of regenerations | 0 | 0 | 0 | 1 | 1 | 1 | 1 |
| Feed rates, cc./min., r.t.: | | | | | | | |
| HC | 100 | 100 | 100 | 50 | 50 | 50 | 50 |
| $N_2$ | 100 | 79 | 58 | 50 | 39 | 29 | 29 |
| $O_2$ | 0 | 21 | 42 | 0 | 11 | 21 | 21 |
| WHSV, total HC feed | 2.07 | 2.07 | 2.07 | 1.03 | 1.03 | 1.03 | 1.03 |
| CT | 3.3 | 3.3 | 3.3 | 6.6 | 6.6 | 6.6 | 6.6 |
| Temperature reaction, °C | 380 | 385 | 430 | 395 | 430 | 430 | 430 |
| Liquid product, wt. percent | 48 | 70 | 57 | 46 | 69 | 62 | 57 |
| Aromatic, wt. percent | 89 | 79 | 72 | 93 | 89 | 81 | 82 |
| Aliphatic, wt. percent | 11 | 21 | 28 | 7 | 11 | 19 | 18 |
| Mole ratio, $O_2$/HC in feed | 0 | .21 | .42 | 0 | .21 | .42 | .42 |
| Product summary: | | | | | | | |
| Aromatic, wt. percent | 43 | 53 | 38 | 43 | 61 | 47 | 44 |
| Aliphatic, wt. percent | 57 | 45 | 52 | 57 | 37 | 45 | 46 |
| Conversion, percent | >95 | >95 | 97 | 99 | 97 | 99 | 99 |

EXAMPLE 7
[2-butene (cis and trans), HZSM-5]

| Run Number | 1 | 2 | 3 | 4 | 5 |
|---|---|---|---|---|---|
| Total time catalyst on stream, hrs | 11.5 | 13 | 14.5 | 16.5 | 17.5 |
| No. of regenerations | 2 | 2 | 3 | 3 | 3 |
| Feed rates, cc./min., r.t. | | | | | |
| HC | 50 | 50 | 50 | 50 | 50 |
| $N_2$ | 50 | 39 | 50 | 29 | 29 |
| $O_2$ | 0 | 11 | 0 | 21 | 21 |
| WHSV, total HC feed | 1.38 | 1.38 | 1.38 | 1.38 | 1.38 |
| CT | 6.6 | 6.6 | 6.6 | 6.6 | 6.6 |
| Temperature reaction, °C | 390 | 430 | 400 | 400 | 400 |
| Liquid product | 40.8 | 47.2 | 43.2 | 68.9 | 59.1 |
| Aromatic, wt. percent | 86 | 91 | 86 | 76 | 71 |
| Aliphatic, wt. percent | 14 | 9 | 14 | 24 | 31 |
| Mole ratio, $O_2$/HC in feed | 0 | .21 | 0 | .42 | .42 |
| Product summary; | | | | | |
| Aromatic, wt. percent | 35.1 | 42.8 | 37.2 | 47.1 | 38.6 |
| Aliphatic, wt. percent | 64.9 | 55.3 | 62.8 | 49.2 | 55.8 |
| Conversion, percent | 96.5 | 97 | 97 | 97 | 95 |

EXAMPLE 8
[Propane, HZSM-5]

| Run Number | 1 | 2 |
|---|---|---|
| Total time catalyst on stream, hrs | 9.6 | 11.0 |
| No. of regenerations | 2 | 2 |
| Feed rates, cc./min., r.t.: | | |
| HC | 67 | 67 |
| $N_2$ | 50 | 39 |
| $O_2$ | | 11 |
| WHSV, total HC feed | .73 | .73 |
| CT | 11.8 | 11.8 |
| Temperature reaction, °C | 515 | 515 |
| Liquid product ($H_2O$ condenser) | 7.0 | 20.2 |
| Aromatic, wt. percent | 99 | 98 |
| Aliphatic, wt. percent | 1 | 2 |
| Mole ratio, $O_2$/HC in feed | 0 | 0.16 |
| Product summary: | | |
| Aromatic, wt. percent | 6.9 | 19.8 |
| Aliphatic, wt. percent | 93.1 | 80.2 |
| Conversion, percent | 45.4 | 41.8 |

EXAMPLE 9
[n-Butane, HZSM-5]

| Run Number | 1 | 2 | 3 | 4 | 5 | 6 | 7 |
|---|---|---|---|---|---|---|---|
| Total time catalyst on stream, hrs | 19 | 21 | 12.5 | 13.8 | 1.3 | 2.4 | 3.7 |
| No. of regenerations | 4 | 4 | 3 | 3 | 0 | 0 | 1 |
| Feed rates, cc./min., r.t.: | | | | | | | |
| HC | 94 | 94 | 62 | 62 | 61 | 62 | 62 |
| $N_2$ | 0 | 79 | 50 | 39 | 50 | 39 | 29 |
| $O_2$ | 0 | 21 | 0 | 11 | 0 | 11 | 21 |
| WHSV, total HC feed | 2.7 | 2.7 | .88 | .88 | .87 | .88 | .88 |
| CT | 7.4 | 3.5 | 12.3 | 12.3 | 12.4 | 12.3 | 12.3 |
| Temperature, reactions, °C | 475 | 470 | 463 | 465 | 513 | 505 | 522 |
| Liquid product | 6.3 | 10.5 | 10.9 | 15.0 | 10.9 | 17.3 | 19.0 |
| Aromatic, wt. percent | 98.5 | 94.3 | 91 | 92 | 95 | 95 | 94 |
| Aliphatic, wt. percent | 1.5 | 5.7 | 9 | 8 | 5 | 5 | 6 |
| Mole ratio, $O_2$/HC in feed | 0 | 0.22 | 0 | .18 | 0 | .18 | .34 |
| Product summary: | | | | | | | |
| Aromatic, wt. percent | 6.2 | 9.7 | 9.9 | 13.8 | 10.4 | 16.5 | 17.9 |
| Aliphatic, wt. percent | 93.8 | 90.3 | 90.1 | 86.2 | 89.6 | 83.6 | 82.1 |
| Conversion, percent | 82 | 53 | 88 | 79 | 82 | 84 | 83 |

EXAMPLE 10
[n-Pentane, HZSM-5]

| Run Number | 1 | 2 | 3 |
|---|---|---|---|
| Total time catalyst on stream, hrs | 4.1 | 6.0 | 7.6 |
| No. of regenerations | 0 | 1 | 1 |
| Feed rates, cc./min., r.t.: | | | |
| HC | 19.7 | 52.7 | 38.2 |
| $N_2$ | 50 | 50 | 39 |
| $O_2$ | 0 | 0 | 11 |
| WHSV, total HC feed | 0.35 | 0.93 | 0.68 |
| CT | 18.9 | 12.9 | 15.0 |
| Temperature reaction, °C | 515 | 515 | 515 |
| Liquid product | 22.3 | 20.6 | 29.2 |
| Aromatic, wt. percent | 88.5 | 86.8 | 93.9 |
| Aliphatic, wt. percent | 11.5 | 13.2 | 6.1 |
| Mole ratio, $O_2$/HC in feed | 0 | 0 | 0.30 |
| Product summary: | | | |
| Aromatic, wt. percent | 19.8 | 17.9 | 27.45 |
| Aliphatic, wt. percent | 80.2 | 82.1 | 68.1 |
| Conversion, percent | 99.3 | 98.9 | 99.1 |

EXAMPLE 11
[n-Hexane, HZSM-5]

| Run Number | 1 | 2 | 3 | 4 | 5 | 6 | 7 | 8 | 9 | 10 |
|---|---|---|---|---|---|---|---|---|---|---|
| Total time catalyst on stream, hrs | 1.25 | 2.35 | 4.35 | 6.35 | 7.50 | 11.0 | 12.7 | 14.7 | 16.5 | 18.0 |
| No. of regenerations | 0 | 0 | 1 | 1 | 1 | 2 | 2 | 3 | 4 | 4 |
| Feed rates, cc./min., r.t.: | | | | | | | | | | |
| HC | 46 | 35 | 43 | 43 | 43 | 43 | 42 | 30 | 41 | 43 |
| $N_2$ | 50 | 50 | 50 | 39 | 39 | 28 | 28 | 28 | 39 | 39 |
| $O_2$ | 0 | 0 | 0 | 11 | 11 | 22 | 22 | 22 | 11 | 11 |
| WHSV, total HC feed | .98 | .75 | .90 | .90 | .90 | .90 | .90 | .63 | .86 | .91 |
| CT | 6.3 | 7.1 | 6.5 | 6.5 | 6.5 | 6.5 | 6.5 | 7.5 | 6.6 | 6.5 |
| Temperature reaction, °C., highest | 516 | 516 | 518 | 516 | 518 | 518 | 516 | 516 | 457 | 535 |
| Liquid product | 20 | 23 | 23 | 33 | 28 | 34 | 29 | 29 | 26 | 26 |
| Aromatic, wt percent | 88 | 84 | 93 | 95 | 96 | 95 | 96 | 96 | 92 | 94 |
| Aliphatic, wt percent | 12 | 16 | 7 | 5 | 4 | 5 | 4 | 4 | 8 | 6 |
| Mole ratio, $O_2$/HC in feed | 0 | 0 | 0 | .26 | .26 | .51 | .52 | .73 | .27 | .26 |
| Product summary: | | | | | | | | | | |
| Aromatic, wt. percent | 18 | 19 | 21 | 32 | 27 | 32 | 28 | 28 | 24 | 24 |
| Aliphatic, wt. percent | 82 | 81 | 78 | 66 | 68 | 56 | 60 | 60 | 74 | 71 |
| Conversion, percent | 99+ | 98+ | 98+ | 97+ | 99+ | 99+ | 99+ | 99+ | 99+ | 99+ |

In sumary, Table I shows a tabulation of runs, taken from Examples 6–11, where the temperatures, contact times and weight hourly space velocities are similar and where increasing amounts of oxygen were substituted for nitrogen in the feed mixture. A significant increase in production of total liquid product and aromatic product was observed.

EXAMPLE 13
[Hexane mixture of Example 12, Au-HZSM-5 (1 wt. percent gold)]

| | | | | | |
|---|---|---|---|---|---|
| Total time catalyst on stream, hrs | 1 | 3 | 4.5 | 5.5 | 6.5 |
| No. of regenerations | 0 | 1 | 2 | 3 | 4 |
| HC feed rates, grams/hour | 10.22 | 10.36 | 10.42 | 10.37 | 10.37 |
| $N_2$ feed rates, cc./min., r.t. | 0 | 0 | 39 | 39 | 39 |
| $O_2$ feed rates, cc./min., r.t. | 0 | 0 | 11 | 11 | 11 |
| WHSV total HC feed | 2.0 | 2.1 | 2.1 | 2.1 | 2.1 |
| CT | 9.2 | 9.1 | 5.4 | 5.4 | 5.4 |
| Temperature reaction, °C | 505 | 600 | 500 | 600 | 700 |
| Liquid product, wt. percent | 29.8 | 39.8 | 32.9 | 34.2 | 40.2 |
| Aromatic, wt. percent | 90.4 | 97.9 | 89.2 | 95.5 | 98.4 |
| Aliphatic, wt. percent | 9.6 | 2.1 | 10.8 | 4.5 | 1.6 |
| Mole ratio, $O_2$/HC in feed | 0 | 0 | .23 | .23 | .23 |
| Product summary: | | | | | |
| Aromatic, wt. percent | 23.4 | 39.0 | 25.4 | 32.9 | 39.6 |
| Aliphatic, wt. percent | 76.2 | 58.5 | 71.3 | 61.6 | 50.2 |
| Conversion, percent | 96.1 | 100 | 96.1 | 99.7 | 100 |

TABLE I
[Summary of effect of CO-feeding oxygen on yield of liquid and aromatic products]

| Hydrocarbon feed | Example No.-Run No. | Temp., °C. | WHSV[a] | CT[b] | $O_2$/HC, mole ratio | Liquid product, wt. percent | Aromatic product, wt. percent | Aromatic product, percent increase |
|---|---|---|---|---|---|---|---|---|
| Propylene | 6-4 | 395 | 1.03 | 6.6 | 0 | 46 | 43 | |
| | 6-5 | 400 | 1.03 | 6.6 | .21 | 69 | 61 | 42 |
| | 6-6 | 430 | 1.03 | 6.6 | .42 | 62 | 47 | 9 |
| 2-Butene | 7-1 | 390 | 1.38 | 6.6 | 0 | 41 | 35 | |
| | 7-3 | 400 | 1.38 | 6.6 | 0 | 43 | 37 | |
| | 7-2 | 430 | 1.38 | 6.6 | .21 | 47 | 43 | 19 |
| | 7-4 | 400 | 1.38 | 6.6 | .42 | 69 | 47 | 31 |
| | 7-5 | 400 | 1.38 | 6.6 | .42 | 59 | 39 | 11 |
| Propane | 8-1 | 515 | .73 | 11.8 | 0 | 7 | 7 | |
| | 8-2 | 515 | .73 | 11.8 | .16 | 20 | 20 | 186 |
| n-Butane | 9-5 | 513 | .87 | 12.4 | 0 | 11 | 10 | |
| | 9-6 | 505 | .88 | 12.3 | .18 | 17 | 17 | 70 |
| | 9-7 | 522 | .88 | 12.3 | .34 | 19 | 18 | 80 |
| n-Pentane | 10-2 | 515 | .93 | 12.9 | 0 | 21 | 18 | |
| | 10-3 | 515 | .68 | 15.0 | .30 | 29 | 27 | 50 |
| n-Hexane | 11-2 | 516 | .75 | 7.1 | 0 | 23 | 19 | |
| | 11-5 | 518 | .90 | 6.5 | .26 | 28 | 27 | 42 |
| | 11-8 | 516 | .90 | 6.5 | .52 | 29 | 28 | 47 |

[a] Weight hourly space velocity=WHSV.
[b] CT=contact time, sec.$^{-1}$.

EXAMPLE 12
[Hexane, HZSM-5]

| | | | | |
|---|---|---|---|---|
| Total time catalyst on stream, hrs | [1]3 | [1]15 | [2]16.5 | [2]26 |
| No. of regenerations | 0 | 4 | 5 | 7 |
| HC feed rates, grams/hour | 9.90 | 10.06 | 9.61 | 20.15 |
| $N_2$ feed rates, cc./min. r.t. | 50 | 39.5 | 39.5 | 0 |
| $O_2$ feed rates, cc./min. r.t. | 0 | 10.5 | 10.5 | 0 |
| WHSV total HC feed | 2.0 | 2.0 | 1.9 | 4.1 |
| CT | 8.4 | 8.3 | 8.5 | 8.8 |
| Temperature reaction, °C | 600 | 600 | 600 | 600 |
| Liquid product, wt percent | 26.4 | 23.9 | 34.6 | 29.8 |
| Aromatic, wt. percent | 99 | 98 | 97 | 90 |
| Aliphatic, wt. percent | 1 | 2 | 3 | 10 |
| Mole ratio, $O_2$/HC in feed | 0 | .22 | .23 | 0 |
| Product summary: | | | | |
| Aromatic, wt. percent | 26.3 | 31.9 | 33.75 | 25.0 |
| Aliphatic, wt. percent | 72.5 | 62.9 | 55.9 | 73.6 |
| Conversion, percent | 100.0 | 99.7 | 99.6 | 98.3 |

[1] n-Hexane.
[2] Mixed hexanes containing about 60% n-hexane, about 20% 3-methylpentane, about 10% 2-methylpentane and about 10% methylcyclopentane, the percentages being by weight.

EXAMPLE 14
[Hexane mixture, U-HZSM-5 (1 wt. percent uranium)]

| | | | | |
|---|---|---|---|---|
| Total time catalyst on stream, hrs | 1.5 | 2.5 | 3.75 | 4.75 |
| No. of regenerations | 0 | 1 | 2 | 3 |
| HC feed rates, grams/hour | 10.42 | 10.42 | 10.42 | 10.37 |
| $N_2$ feed rates, cc./min., r.t. | 0 | 0 | 39 | 39 |
| $O_2$ feed rates, cc./min., r.t. | 0 | 0 | 11 | 11 |
| WHSV, total HC feed | 2.1 | 2.1 | 2.1 | 2.1 |
| CT | 9.0 | 9.0 | 5.4 | 5.4 |
| Temperature reaction, °C | 500 | 600 | 500 | 600 |
| Liquid product | 29.9 | 37.4 | 32.1 | 34.1 |
| Aromatic, wt. percent | 74.5 | 94.9 | 77.1 | 94.8 |
| Aliphatic, wt. percent | 25.5 | 5.1 | 22.9 | 5.2 |
| Mole ratio $O_2$/HC in feed | | | 0.23 | 0.23 |
| Product summary: | | | | |
| Aromatic, wt. percent | 22.9 | 35.7 | 25.4 | 32.5 |
| Aliphatic, wt. percent | 76.6 | 62.4 | 71.0 | 61.8 |
| Conversion, percent | 96.6 | 99.9 | 96.0 | 99.9 |

EXAMPLE 15

[n-Hexane, Zn, Cu-ZSM-5 (1 wt. percent copper; 1 wt. percent zinc)]

| | | |
|---|---|---|
| Total time catalyst on stream, hrs | 6.4 | 8.4 |
| No. of regenerations | 1 | 2 |
| HC feed rates, grams/hour | 18.60 | 18.30 |
| $N_2$ feed rates, cc./min., r.t. | 0 | 39 |
| $O_2$ feed rates, cc./min., r.t. | 0 | 11 |
| WHSV, total HC feed | 3.7 | 3.7 |
| CT | 7.1 | 4.5 |
| Temperature reaction, °C | 600 | 600 |
| Liquid product | 47.0 | 49.4 |
|    Aromatic, wt. percent | 97.8 | 98.6 |
|    Aliphatic, wt. percent | 2.2 | 1.4 |
| Mole ratio $O_2$/HC in feed | 0 | 0.13 |
| Product summary: | | |
|    Aromatic, wt. percent | 45 | 48.5 |
|    Aliphatic, wt. percent | 52 | 44.1 |
| Conversion, percent | 99.3 | 99.8 |

In Examples 6 through 15 the "oxygen" referred to in the data tabulation is derived from air or air enriched so it contains approximately twice the normal amount of oxygen. For instance, in Example 6, Run No. 2, air was used; the air used in Example 6, Run No. 3, was oxygen enriched.

Although the present invention has been described with certain specific embodiments, it is to be understood that modifications and variations may be resorted to without departing from the spirit and scope of this invention as those skilled in the art will readily understand. Such modifications and variations are considered to be within the purview and scope of the appended claims.

We claim:

1. A process for improving the yield of aromatics from hydrocarbons selected from the group consisting of aliphatic olefins and paraffins which comprises contacting, at a temperature of from about 500° F. to about 1300° F., a mixture of said hydrocarbon and air or oxygen with a crystalline aluminosilicate zeolite, at an oxygen to hydrocarbon molar ratio between about 0.1 and about 0.75.

2. The process of claim 1 wherein the temperature is from about 650° F. to about 1150° F.

3. The process of claim 1 wherein the said molar ratio is between about 0.15 to about 0.5.

4. The process of claim 1 wherein the weight hourly space velocity is from about 0.5 to about 10.

5. The process of claim 1 wherein the gas hourly space velocity is from about 0.1 to about 10.

6. The process of claim 1 wherein the contact time is from about 1 to about 20 seconds.

7. The process of claim 1 wherein the crystalline aluminosilicate zeolite has a silica-to-alumina ratio greater than 15.

8. The process of claim 1 wherein the crystalline aluminosilicate zeolite has pore siezs greater than 5 angstrom units.

9. The process of claim 1 wherein the said zeolite is ZSM-5.

10. The process of claim 1 wherein the said zeolite is HZSM-5.

11. The process of claim 1 wherein the said zeolite is Pt-$NH_4$-ZSM-5.

12. The process of claim 11 wherein the platinum is present in the zeolite to the extent of about 0.5% by weight.

13. The process of claim 1 wherein the said zeolite is Au-ZSM-5.

14. The process of claim 13 wherein the gold is present in the zeolite to the extent of about 0.045% by weight.

15. The process of claim 1 wherein the said zeolite is U-ZSM-5.

16. The process of claim 15 wherein the uranium is present in the zeolite to the extent of about 0.25%.

17. The process of claim 1 wherein the hydrocarbon contains 2 to 16 carbon atoms.

18. The process of claim 17 wherein the hydrocarbon is ethylene.

19. The process of claim 17 wherein the hydrocarbon is propylene.

20. The process of claim 17 wherein the hydrocarbon is butene.

21. The process of claim 17 wherein the hydrocarbon is propane.

22. The process of claim 17 wherein the hydrocarbon is butane.

23. The process of claim 17 wherein the hydrocarbon is pentane.

24. The process of claim 17 wherein the hydrocarbon is hexane or a mixture of hexanes.

References Cited

UNITED STATES PATENTS

| | | | |
|---|---|---|---|
| 2,992,283 | 7/1961 | Eng | 260—673 |
| 2,972,643 | 2/1961 | Kimberlin, Jr., et al. | 260—673 |
| 3,562,797 | 2/1971 | Hu | 260—683.3 |
| 3,308,069 | 3/1967 | Wadlinger et al. | 252—455 |
| 3,140,253 | 7/1964 | Plank et al. | 208—120 |
| 3,168,587 | 2/1965 | Michaels et al. | 260—683.3 |
| 2,972,643 | 6/1961 | Kimberlin, Jr., et al. | 260—673 |

DELBERT E. GANTZ, Primary Examiner

J. M. NELSON, Assistant Examiner

U.S. Cl. X.R.

260—673.5, 683.3, 680 E; 208—138

PO-1050
(5/69)

UNITED STATES PATENT OFFICE
CERTIFICATE OF CORRECTION

Patent No. 3,775,501          Dated November 27, 1973

Inventor(s) Warren W. Kaeding and Stephen A. Butter

It is certified that error appears in the above-identified patent and that said Letters Patent are hereby corrected as shown below:

Column 4, line 64, "3.71 ± 0.07" should be -- 3.71 ± 0.05 --

Column 5, line 49, under column headed "HCl" the number between "3.05" and "2.95" should be -- 2.98 --

Column 5, line 72, under column headed "As Made", "1.92" should be -- 1.91 --

Column 8, line 6, after "cations" insert -- associated therewith replaced by a wide variety of other cations --

Column 13, Example 12 under column headed "(1)15", line 8, "23.9" should be -- 32.9 --

Claim 8, line 2, "siezs" should be -- sizes --

Signed and sealed this 16th day of April 1974.

(SEAL)
Attest:

EDWARD M. FLETCHER, JR.
Attesting Officer

C. MARSHALL DANN
Commissioner of Patents